April 26, 1960   F. A. HANSEN   2,934,237
SAFETY PRESSURE RELIEF DEVICE
Filed March 20, 1958   2 Sheets-Sheet 1

INVENTOR.
FRANKLIN A. HANSEN
BY
ATTORNEY

April 26, 1960 F. A. HANSEN 2,934,237
SAFETY PRESSURE RELIEF DEVICE
Filed March 20, 1958 2 Sheets-Sheet 2

INVENTOR.
FRANKLIN A. HANSEN
BY
ATTORNEY

United States Patent Office 2,934,237
Patented Apr. 26, 1960

2,934,237

SAFETY PRESSURE RELIEF DEVICE

Franklin A. Hansen, Kansas City, Mo., assignor to Black, Sivalls & Bryson, Inc., Kansas City, Mo., a corporation of Delaware Application March 20, 1958, Serial No. 722,693

5 Claims. (Cl. 220—89)

The present invention relates to a safety pressure relief device for use to protect pressure systems from excess pressure conditions where such pressure systems normally operate at extremely high pressures.

Prior to the present invention many types of safety pressure relief devices were available to protect pressure systems from excess pressures. With the advancement in the technology of processing in many industries a greater number of processes are being performed in pressure systems operating at extremely high pressures. As this type of processing has progressed, demanding higher system pressures, safety pressure relief devices have become more important and the known prior art devices have been found to be unsatisfactory for the containing of such high system pressures and also unsatisfactory in the relieving of such pressure systems at the desired condition of excess pressure.

Prior devices have failed to function properly under such high pressures for several reasons. The most important failure has been the inability of such devices to contain these extremely high pressures. These prior devices have been subject to excessive leakage of the pressure fluid and also have failed to rupture within the normal limits of deviation from the desired relieving pressure. Attempts to devise successful models of the known devices have resulted in excessively large units which function erratically by rupturing prematurely or by failing to rupture at the desired rupture pressure. The inability of prior devices to function properly to protect systems operating under extremely high pressures can be better explained by example. Such systems utilize operating pressures up to 100,000 pounds per square inch and a pressure relief device is needed to contain such operating pressures and to relieve the system of pressure when the system pressure exceeds the desired relieving pressure which will be above 100,000 pounds per square inch. It should be noted that the foregoing reference to specific pressures is intended as an example of the pressure at which the device of the present invention will operate but is not intended to imply that the device of the present invention is limited to use only for such extremely high pressures. The device of the present invention will operate satisfactorily at pressures substantially below the above example.

Therefore, the primary object of the present invention is to provide a safety pressure relief device for the protection of systems operating at extremely high pressures. A further object of the present invention is to provide a pressure actuated seal for a safety pressure relief device. A still further object of the present invention is to provide a safety pressure relief device capable of retaining extremely high pressures without leaking. Another object of the present invention is to provide a rupturable safety pressure relief device for a system operating at extremely high pressures which will rupture consistently at the desired relieving pressure.

To accomplish these and other objects of the present invention I have provided improved apparatus illustrated in the accompanying drawings wherein.

Figure 1:
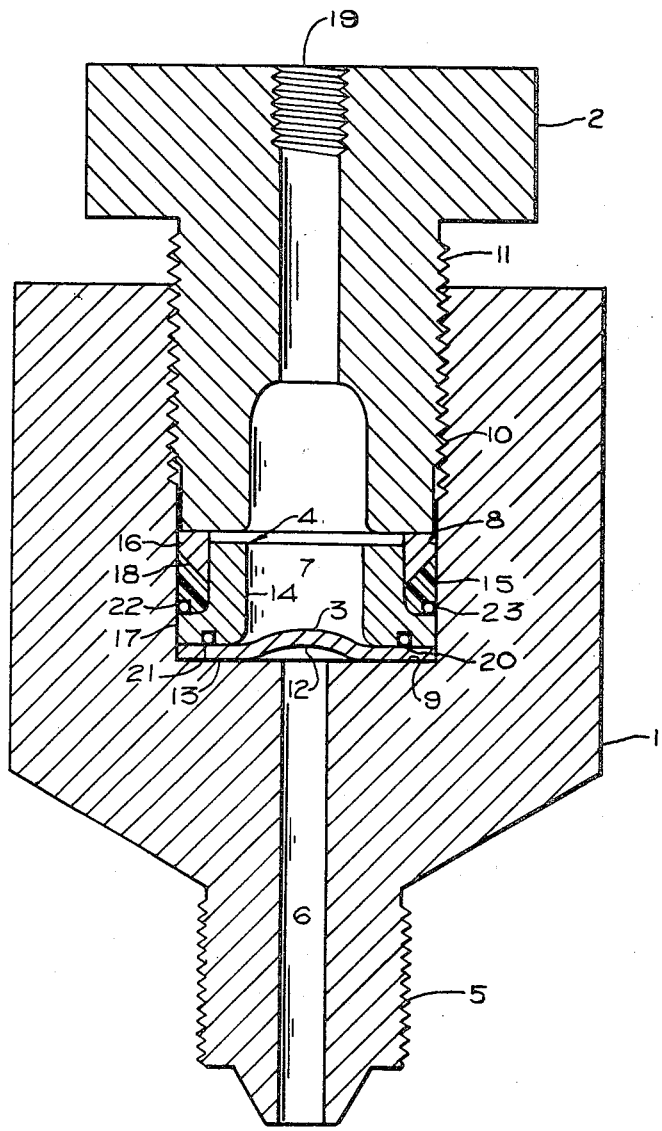
Fig. 1 is a sectional view of a device constructed to embody the novel features of the present invention.

Referring more in detail to the drawings:

The device illustrated in Fig. 1 is composed of body member 1, holddown member 2, rupturable diaphragm 3 and pressure actuated sealing assembly 4. Nipple 5 extends from the lower portion of body member 1 to facilitate connection of the device of the present invention into a pressure system (not shown) to be protected. Any other suitable means of connection may be used without departing from the novel features of the present invention. Also, it is contemplated that body member 1 may be replaced by adapting the wall of the vessel containing the system pressure to have a configuration similar to the internal configuration of body member 1 in order to receive diaphragm 3, assembly 4 and holddown member 2. Relief passageway 6 extends through nipple 5 as shown and communicates with cavity 7 within body member 1 formed by bore 8 and shoulder 9. The outer portion of bore 8 is threaded as indicated at 10 to receive threaded portion 11 of holddown member 2.

Rupturable diaphragm 3 comprises central crown 12 and outer flange 13 and is positioned within bore 8 on shoulder 9. Pressure actuated sealing assembly 4 comprises support member 14, annular sealing member 15 and annular piston 16. Support member 14 is tubular in shape, having outwardly extending base flange 17 positioned on flange 13 of diaphragm 3. Annular sealing member 15 is positioned on base flange 17 of support member 14 and between bore 8 and support member 14. Annular sealing member 15 is suggested to be formed of a resilient material such as nylon. Annular piston 16 is positioned on annular sealing member 15 between bore 8 and support member 14. The surface of contact 18 between annular sealing member 15 and annular piston 16 is conical, flaring upwardly and outwardly.

Holddown member 2 threads into body member 1 contacting annular piston 16. Relief passageway 19 extends through holddown member 2. The exterior portion of relief passageway 19 can be threaded to receive a connecting fitting (not shown) for conducting the fluid which is relieved through relief passageway 19 from the pressure system to some suitable disposal means.

The portion of flange 17 which is positioned on flange 13 of diaphragm 3 contains groove 20 in which is placed O-ring 21. Also, the lower outer edge of annular sealing member 15 is formed to be groove 22 which receives O-ring 23.

Figure 2:
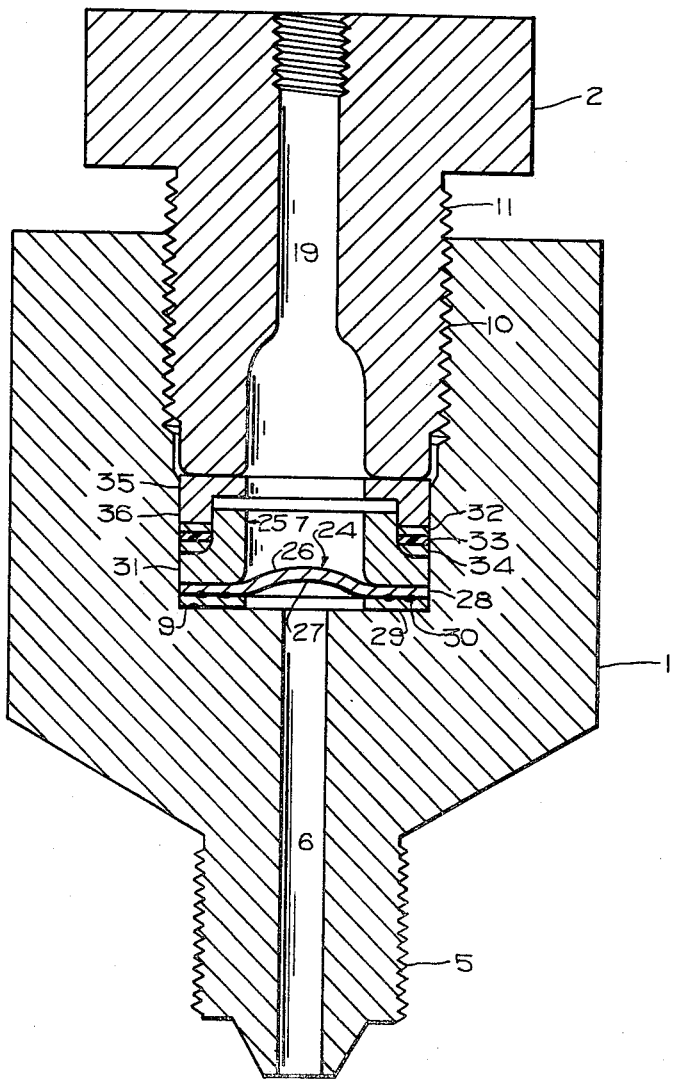
Fig. 2 is a sectional view of another form of the device illustrated in Fig. 1.

In Fig. 2 the components of the device which are similar in structure to the components of the device illustrated in Fig. 1 are given the same numbers. The device illustrated in Fig. 2 comprises body member 1, holddown member 2, rupturable diaphragm assembly 24 and pressure actuated sealing assembly 25. Body member 1 is connected into a pressure system (not shown) by threading nipple 5 therein. Relief passageway 6 extends through nipple 5 and communicates with cavity 7 formed by bore 8 and shoulder 9 within body member 1. The outer portion of bore 8 is threaded as indicated at 10 to receive threaded portion 11 of holddown member 2. Relief passageway 19 extends through holddown member 2 and may be threaded near its exterior opening to receive a connecting fitting (not shown) for conducting the fluid which is relieved through relief passageway 19 from the pressure system to some suitable disposal means.

Rupturable diaphragm assembly 24 is composed of rupturable diaphragm 26 having central crown portion 27 surrounded by flange portion 28 and reinforcing ring 29 bonded to the under side of flange portion 28 by silver solder 30 or other suitable bonding means.

Pressure actuated sealing assembly 25 is composed of support member 31, sealing rings 32, 33 and 34 and piston 35. Sealing rings 32 and 34 are recommended to be made from a soft metal material, preferably a soft metal such as copper, aluminum or soft steel, and sealing ring 33 is recommended to be made from a resilient material such as a gasketing rubber.

As shown in Fig. 2 rupturable diaphragm assembly 24 is positioned in cavity 7 with reinforcing ring 29 resting on shoulder 9. Support member 31 is positioned on flange portion 28 of diaphragm 26 and sealing rings 32, 33 and 34 are inserted between support member 31 and bore 8. Piston 35 is annular in shape and has outer depending flange 36 positioned on sealing ring 32 and is partially between support member 31 and bore 8. Holddown member 2 is installed in the threaded portion 10 of bore 8 and is tightened into engagement with piston 35 sufficiently to provide an initial seal for rupturable diaphragm assembly 24 and pressure actuated sealing assembly 25.

Initial sealing of the device illustrated in Fig. 1 is accomplished by tightening holddown member 2 of bore 8 into threaded portion 10 sufficiently to provide contact to allow O-rings 21 and 23 to seal and also to cause annular sealing member 15 to seal against flange 17 of support member 14. Upon exposing the device to pressure rupturable diaphragm 3 will be forced against support member 14 preserving the pressure seal between flange 13 of rupturable diaphragm 3 and base flange 17 of support member 14. Since the entire area under diaphragm 3 will be exposed to the system operating pressure, the pressure force will be transmitted to support member 14. Holddown member 2, being in threaded engagement with body member 1, will support annular piston 16 in a manner causing annular sealing member 15 to be forced outward against bore 8 of body member 1 due to the conical shape of surface 18 between piston 16 and sealing member 15. Sealing member 15 will also be forced against support member 14 to retain pressure when system pressures rise to a level above that pressure at which O-rings will serve a sealing function. Thus, as pressures under rupturable diaphragm 3 increase to its rupture pressure, the device will remain sealed since a pressure increase is utilized to cause an increase in sealing forces.

The device shown in Fig. 2 is initially sealed in the same manner, holddown member 2 being tightened in body member 1 until flange portion 28 of rupturable diaphragm 26 seals against support member 31, sealing ring 33 seals against bore 8 and sealing ring 34 seals against support member 31.

The exposure of the device to pressure will cause the entire area under rupturable diaphragm assembly 24 to be forced against support member 31 in sealing engagement. This force will be transmitted to sealing ring 34 causing sealing ring 33 to be squeezed since sealing ring 32 is restrained by piston 35 and holddown member 2. The compression force on sealing ring 33 will cause it to exert additional sealing force against bore 8 and support member 31. As system pressures rise to the rupture pressure of rupturable diaphragm 26, sealing rings 32 and 34 will be subjected to sufficient compression to cause them to seal against bore 8 and support member 31. Reinforcing ring 29 is designed to be sufficiently strong to retain rupturable diaphragm 26 in its seated position against support member 31 and thereby maintaining its designed rupture pressure.

From the foregoing it can be seen that I have provided a new and novel safety pressure relief device for the protection of systems operating at extremely high pressures. The present invention also provides a rupturable diaphragm type safety pressure relief device having a pressure actuated sealing mechanism which will rupture consistently at its desired rupture pressure.

What I claim and desire to secure by Letters Patent is:

1. A high pressure safety pressure relief device comprising, a body having an opening therein and an annular shoulder surrounding said opening, a diaphragm positioned across said opening on said shoulder, a support member having an annular opening therein, said support member positioned on said diaphragm, said support member having an upstanding annular portion, a sealing member positioned within the space between said upstanding annular portion of said support member and said body, a piston also positioned in said annular space above said sealing member and a preloading holddown member positioned in contact with said piston to provide an initial seal for said relief device said holddown member having a relief passageway extending completely therethrough to provide for the complete relief of pressure upon rupture of said diaphragm.

2. A high pressure safety pressure relief device comprising, a body member having an internal bore and a relief passageway, a rupturable diaphragm positioned in said internal bore and across said relief passageway of said body member, said rupturable diaphragm having a central rupturable portion and an outer flange, a pressure actuated sealing member positioned in said bore to maintain a pressure seal, a holddown member positioned in said bore in support relationship to said pressure actuated sealing member, said pressure actuated sealing member comprising a tubular support member having a lower outwardly flaring flange, an annular resilient sealing member and an annular piston member, said flange of said support member positioned on the flange of said diaphragm, said annular sealing member positioned between said support member and said internal bore of said body member and said annular piston positioned between said annular sealing member and said holddown member, said holddown member having a relief passageway extending therethrough to provide pressure relief upon rupture of said rupturable diaphragm, and means securing said holddown member to said body member.

3. Invention according to claim 2 wherein said annular sealing member and said annular piston contact each other in an inwardly converging surface with respect to said body member.

4. Invention according to claim 2 including two annular sealing rings wherein said annular resilient sealing member is positioed between said two annular sealing rings.

5. Invention according to claim 2 including an O-ring positioned in said flange of said support member to provide an initial pressure seal between said flange of said support member and the flange of said rupturable diaphragm.

References Cited in the file of this patent

UNITED STATES PATENTS 2,437,836     Santiago _____ Mar. 16, 1948